Patented Jan. 6, 1931

1,788,170

UNITED STATES PATENT OFFICE

MATHIAS PIER, OF HEIDELBERG, AND GUSTAV WIETZEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF ORGANIC COMPOUNDS CONTAINING OXYGEN

No Drawing.    Application filed October 27, 1925.    Serial No. 65,239.

We have found that the synthetic manufacture and production of alcohols or other organic compounds containing oxygen by catalytic hydrogenation of carbon oxids can be effected in a very economical manner by employing gas mixtures, which contain a high percentage, of inert, preferably extraneous, gases and by working in a circulatory system with a continuous removal of part of the circulatory system, preferably after they have passed the vessel containing the catalyst, and replacing the said removed gas mixture by fresh gas mixture in such proportions as to constantly maintain an approximately constant composition of the gas mixture. According to this invention it is possible to work regularly and continuously and to maintain exact conditions of working notwithstanding the presence of the large mass of inert gases. By reason of their presence it may be preferable to work with a smaller speed of the gas current or at higher temperatures or at higher pressures than when employing undiluted gas mixtures. The yields obtained by this process are equal to and sometimes even higher than those obtained with pure gases under the usual conditions of working. The use of gases rich in inert gases is very advantageous in that the excess heat evolved by the reaction is absorbed or easily carried away and the difficulties sometimes caused by the said evolution of heat are avoided. The process hereing described may also be employed with gases containing a large excess of one of the reaction gases which then acts as an inert diluent, or when in the course of the reaction, gases useless for the reaction are formed by means of by-reactions.

The process herein described is of special importance economically as it is possible to utilize gases which are available in large quantities at a low cost and which could not be employed hitherto for the manufacture of oxygen containing organic compounds. Temperatures of between about 200 and 500° C. and pressures surpassing 50 atmospheres are of particular advantage for carrying out the process of the present invention, and, as examples of the percentages of inert gases, which should be present in the circulating gas, 25 percent or more may be mentioned.

The following example shows a method of carrying the invention into practical effect but the invention is not limited to this example.

*Example*

Power-gas containing 5.5 per cent of carbon dioxid, 27.8 per cent of carbon monoxid, 15.6 per cent of hydrogen, 2.6 per cent of methane and 48.5 per cent of nitrogen, is first passed in mixture with steam over a suitable catalyst, for example iron oxid at an elevated temperature so as to decompose so much of the carbon monoxid with steam that the resulting gas mixture contains carbon monoxid and hydrogen in a proportion of about 1 to 2. After the carbon dioxid is absorbed by water under pressure, the gas containing about 15.3 per cent of carbon monoxid, 30.6 per cent of hydrogen, 2.8 per cent of methane and 51.3 per cent of nitrogen, is circulated over a catalyst suitable for the synthesis of methanol, at about 400 degrees centigrade under a pressure of about 1000 atmospheres. The gas leaving the vessel containing the catalyst is cooled whereby large quantities of methanol are condensed. Part of the residual gas is continuously removed from the circular course in the ratio of 12650 parts of residual gas for each 15000 parts of fresh gas introduced. The percentage of the circulating gas is hereby maintained constantly at 12 per cent carbon monoxid and 24 per cent hydrogen.

We claim:

1. In the manufacture and production of organic compounds containing oxygen by catalytic hydrogenation of oxides of carbon in a circulatory system under pressure and at an elevated temperature and in the presence of a catalyst capable of causing the formation of methanol, the step of employing a gas mixture containing a high percentage of an inert gas not required for the reaction and continuously removing part of the gas from the circulatory system and replacing it by fresh gas mixture in such proportion as to maintain a substantially constant composition of the circulating gas mixture.

2. In the manufacture and production of organic compounds containing oxygen such as methanol by the interaction of hydrogen and carbon monoxide at a temperature of between about 200° and 500° C. and a pressure surpassing 50 atmospheres in the presence of a methanol forming catalyst, the step of employing in a circulatory system a gas mixture containing more than 25 per cent of an inert extraneous gas not taking part in the reaction, continuously withdrawing part of the gas from the circulatory system and after it has been freed from methanol replacing said removed gas by fresh gas mixture in such proportion as to maintain a substantially constant composition of the circulating gas mixture.

3. A process for the manufacture and production of methanol which comprises circulating a mixture of a gas comprising about 15.3 per cent of carbon monoxide, about 30.6 per cent of hydrogen, about 2.8 per cent of methane and about 51.3 per cent of nitrogen over a catalyst capable of causing the formation of methanol, removing part of the residual gas mixture and continuously replacing it by a fresh gas so as to constantly maintain a proportion of about 12 per cent of carbon monoxide and about 24 per cent of hydrogen in the circulating gas.

In testimony whereof we have hereunto set our hands.

MATHIAS PIER.
GUSTAV WIETZEL.